Patented Nov. 4, 1952

2,616,934

UNITED STATES PATENT OFFICE 2,616,934

HYDROGEN TRANSFER PROCESS

Herman Pines and Bruno Kvetinskas, Chicago, Ill., assignors to Universal Oil Products Company, Chicago, Ill., a corporation of Delaware No Drawing. Application December 29, 1948, Serial No. 68,092

4 Claims. (Cl. 260—666)

This invention relates to a process for effecting hydrogen transfer reactions between olefinic hydrocarbons and particularly for producing saturated hydrocarbons of gasoline boiling ranges and also higher boiling unsaturated hydrocarbons.

An object of this invention is to convert olefinic hydrocarbons into saturated hydrocarbons of similar boiling range and higher boiling more-highly unsaturated hydrocarbons.

Another object of this invention is to condense an olefinic hydrocarbon at hydrogen transfer conditions to produce low boiling saturated hydrocarbons and higher boiling unsaturated hydrocarbons.

One specific embodiment of this invention relates to a hydrocarbon conversion process which comprises reacting an olefinic hydrocarbon at hydrogen transfer conditions in the presence of sulfur dioxide.

Another embodiment of this invention relates to a hydrocarbon conversion process which comprises reacting an alkene at hydrogen transfer conditions in the presence of sulfur dioxide.

Olefinic hydrocarbons which may be used as starting materials in this process include normally gaseous and liquid olefinic hydrocarbons and particularly tertiary olefinic hydrocarbons. Thus isobutylene, branched chain pentenes and other branched chain normally liquid olefins are particularly desirable as starting materials for effecting this hydrogen transfer process to produce low boiling saturated hydrocarbons and higher boiling more highly unsaturated hydrocarbons.

This invention relates to a hydrogen transfer process by which an olefinic hydrocarbon or mixture of olefinic hydrocarbons is converted into saturated hydrocarbons of gasoline boiling range and higher boiling more-unsaturated hydrocarbons including cyclic hydrocarbons. The process is carried out at a temperature of from about 225° to about 500° C. and a pressure of from about 15 to about 200 atmospheres in the presence of from about 5 to about 70 mole per cent of sulfur dioxide based upon the amount of olefinic hydrocarbon charged.

In the presence of sulfur dioxide and at the above-mentioned operating conditions, an olefinic hydrocarbon undergoes a complex series of reactions which may be referred to in the aggregate as "a conjunct polymerization reaction" and comprises an initial polymerization and condensation reaction between several molecules of the olefinic hydrocarbon present in the charging stock and as the reaction progresses further, cyclization and isomerization of the polymers and condensation products occur, accompanied by a reaction between the reaction products or "conjunct polymers" present in the reaction mixture whereby a portion of the conjunct polymers is converted into saturated hydrocarbons by virtue of a hydrogen transfer at the expense of other components which are converted into highly unsaturated compounds, generally cyclic in nature and of higher molecular weight. The resulting unsaturated conjunct polymers comprise a series of high molecular weight polycyclic compounds.

In batch-type operation, the usual procedure consists in flushing a steel autoclave with hydrogen, evacuating the hydrogen to remove air from the autoclave, passing in an olefinic hydrocarbon or olefinic hydrocarbon fraction from a suitable charging means, adding the desired quantity of sulfur dioxide under pressure to the autoclave containing the olefinic hydrocarbon and then rapidly heating the autoclave to a temperature of from about 225° to about 500° C. at which it is maintained for a desired reaction time such as, for example, from one to five hours and then the autoclave is removed from the heating means and cooled rapidly. When the autoclave and its contents have cooled to about room temperature, the gaseous products are released, for example, through an ice-cooled trap and a second trap cooled by solid carbon dioxide and acetone, and the gases are then passed to a gas-sampling bottle. The liquid product recovered from the autoclave is then subjected to fractional distillation and the reaction products are identified.

The following example is given to illustrate the character of the results obtained by the use of a specific embodiment of the present invention although the data presented are not introduced with the intention of restricting unduly the generally broad scope of the invention.

The rotatable steel autoclave of 850 cc. capacity was flushed with hydrogen to remove air, the autoclave was then evacuated and 168 grams (3 moles) of isobutylene and 19 grams of sulfur dioxide were added to the autoclave. The autoclave was then heated quickly to a temperature of 400° C. and maintained at that temperature for 3 hours and at a maximum working pressure of 182 atmospheres. After this time of heating, the autoclave was cooled to room temperature at which the autoclave pressure was 118 atmospheres. The autoclave was discharged by passing the exit gases through an ice-cooled trap, thence to a trap cooled by solid carbon dioxide and acetone and into a gas holder for sampling. The reaction products recovered consisted of 50 grams of condensible gases, (mainly carbon dioxide) 117 grams of liquid products which represented a 71% yield of liquid product based upon the isobutylene charged. Analysis of the 50 grams of condensible gases gave the results shown in Table I.

*Table I*

|  | Mole Percent | |
|---|---|---|
|  | With sulfur dioxide | Without sulfur dioxide |
| Propylene | | 1 |
| Propane | 18.3 | 9.4 |
| Isobutylene | 3.9 | 41.7 |
| n-Butylene | 2.0 | 3.8 |
| Isobutane | 64.4 | 37.7 |
| n-Butane | 6.6 | |
| C$_5$+ | 4.4 | 6.4 |

By comparing the results obtained on isobutylene in the presence and absence of sulfur dioxide, it is noted that the sulfur dioxide caused a substantial amount of hydrogen transfer to occur as judged by the high yields of isobutylene and propane. The liquid product which had the boiling range and refractive index given in Table II also contained small amounts of sulfur compounds.

*Table II*

*Distillation of Normally Liquid Reaction Products*

|  | Vol., Percent Over | $n_D^{20}$ |
|---|---|---|
| 65–85° C | 2.5 | 1.3857 |
| 85–95° C | 7.6 | 1.3960 |
| 95–128° C | 33.8 | 1.4106 |
| 128–150° C | 2.4 | 1.4462 |
| 150–175° C | 11.0 | 1.4511 |
| 175° C. and higher | 42.7 | |
| Br No. of 95–128° C. fraction | 20 | |

The fact that the bromine number of the 95–128° C. fraction was 20 indicates that this fraction consisted of about 86% octanes and 14% of octenes. These octanes were derived from the corresponding olefins by hydrogen transferred from the higher boiling fractions which thus became more unsaturated.

We claim as our invention:

1. A hydrocarbon conversion process which comprises reacting an olefin hydrocarbon at a temperature of from about 225° to about 500° C. and at a pressure of from about 15 to about 200 atmospheres in the presence of from about 5 to about 70 mole per cent of sulfur dioxide based upon said olefin hydrocarbon.

2. A hydrocarbon conversion process which comprises reatcing a tertiary olefin hydrocarbon at a temperature of from about 225° to about 500° C. and at a pressure of from about 15 to about 200 atmospheres in the presence of from about 5 to about 70 mole per cent of sulfur dioxide based upon said olefin hydrocarbon.

3. A hydrocarbon conversion process which comprises reacting a normally fluid tertiary alkene at a temperature of from about 225° to about 500° C. and at a pressure of from about 15 to about 200 atmospheres in the presence of from about 5 to about 70 mole per cent of sulfur dioxide based upon said alkene hydrocarbon.

4. The process defined in claim 2 further characterized in that said tertiary olefin comprises isobutylene.

HERMAN PINES.
BRUNO KVETINSKAS.

REFERENCES CITED

The following references are of record in the file of this patent:

UNITED STATES PATENTS

| Number | Name | Date |
|---|---|---|
| 1,893,774 | Halloran et al. | Jan. 10, 1933 |
| 1,997,144 | Hofsasz | Apr. 9, 1935 |
| 2,114,292 | Frey et al. | Apr. 19, 1938 |
| 2,126,817 | Rosen | Aug. 16, 1938 |
| 2,145,576 | Atwell | Jan. 31, 1939 |
| 2,442,643 | Elwell et al. | June 1, 1948 |
| 2,442,644 | Elwell et al. | June 1, 1948 |